United States Patent
Kotlier

[19]

[11] Patent Number: 5,938,223
[45] Date of Patent: Aug. 17, 1999

[54] FOLDING TRAILER GOOSENECK

[75] Inventor: Bernard M. Kotlier, San Jose, Calif.

[73] Assignee: Brunswick Corporation, Lake Forest, Ill.

[21] Appl. No.: 08/780,831

[22] Filed: Jan. 10, 1997

[51] Int. Cl.⁶ .................................................. B62K 27/00
[52] U.S. Cl. ............................................................ 280/204
[58] Field of Search .................................... 280/202, 204, 280/230, 231, 239; 403/84, 102

[56] References Cited

U.S. PATENT DOCUMENTS

| | | | |
|---|---|---|---|
| 3,787,065 | 1/1974 | Grimm | 280/204 |
| 3,791,672 | 2/1974 | Pera | 280/287 |
| 3,934,666 | 1/1976 | Ellington | 180/11 |
| 4,174,120 | 11/1979 | Freeman | 280/204 |
| 4,283,070 | 8/1981 | Forrestall et al. | 280/274 |
| 4,413,835 | 11/1983 | Hazelett | 280/204 |
| 4,417,745 | 11/1983 | Shomo | 20/287 |
| 4,458,908 | 7/1984 | Strong | 280/239 |
| 4,460,192 | 7/1984 | Takamiya et al. | 280/287 |
| 4,756,541 | 7/1988 | Albitre | 280/204 |
| 4,768,798 | 9/1988 | Reed et al. | 280/281 |
| 4,786,070 | 11/1988 | Adee | 280/281 |
| 4,895,386 | 1/1990 | Hellestam et al. | 280/287 |
| 4,900,047 | 2/1990 | Montague et al. | 280/278 |
| 4,915,404 | 4/1990 | Chonan | 280/288 |
| 5,067,738 | 11/1991 | O'Connor | 280/204 |
| 5,251,359 | 10/1993 | Finkl | 403/102 |
| 5,301,972 | 4/1994 | Lee | 280/278 |
| 5,474,316 | 12/1995 | Britton | 280/204 |

FOREIGN PATENT DOCUMENTS

| | | |
|---|---|---|
| 51516 | 2/1896 | Canada . |
| 1 235 435 | 12/1986 | Canada . |
| 2019471 | 11/1993 | Canada . |
| 968.629 | 12/1950 | France . |
| 185820 | 8/1936 | Germany . |
| 811077 | 8/1951 | Germany . |

OTHER PUBLICATIONS

New Cyclist Magazine article by Jim McGurn, undated.

*Primary Examiner*—Lee W. Young
*Assistant Examiner*—C. T. Bartz
*Attorney, Agent, or Firm*—Rhodes Coats & Bennett, L.L.P.

[57] ABSTRACT

A trailer of the type for securing to and following a bicycle. The trailer includes a frame, a wheel rotatably mounted on the frame, and an extension member having first and second ends. The first end is hingedly connected to the frame such that the extension member is selectively positionable between an extended position wherein the extension member extends outwardly from the frame and a folded position wherein the extension member is disposed adjacent the frame for compactness of storage and transport.

23 Claims, 2 Drawing Sheets

5,938,223

FOLDING TRAILER GOOSENECK

FIELD OF THE INVENTION

The present invention is directed to trailers of the type for detachably securing to bicycles and the like, and, more particularly, to a folding trailer hitch for such trailers and to a trailer incorporating the same.

BACKGROUND OF THE INVENTION

Detachable tandem bicycle trailers have recently become a popular means for converting a conventional bicycle to a tandem bicycle. Typically, the trailer takes the form of a conventional bicycle except that the front wheel, steering head, fork, and related hardware are replaced with a gooseneck. The gooseneck extends over the rear wheel of an associated bicycle and has a clamp or other suitable means for securing the end of the gooseneck to the conventional bicycle's frame, typically at the seatpost.

While the tandem bike trailer as described above may be conveniently attached to the leading bicycle, its configuration necessarily makes it cumbersome and inconvenient to transport and store. Because the front wheel is replaced with a gooseneck which must extend all the way over the wheel of the leading bicycle, the overall length of the trailer is somewhat greater than that of a conventional bicycle. Whereas conventional bicycles can be reduced in length for storage or transport by removing the front wheel, this cannot be done with the trailer.

Thus, there exists a need for a means for converting a detachable tandem bike trailer to a configuration which is more compact and thus more suitable for storage and transport. There exists a need for such a means which is easily and conveniently operated. However, such capability should not be provided at the expense of the strength and stability of the tandem trailer when the tandem trailer is in use. In particular, at least a minimum degree of resistance to torsion and overbending of the gooseneck must be provided.

SUMMARY OF THE INVENTION

The present invention is directed to a trailer of the type for securing to and following a bicycle which overcomes the shortcomings of the tandem bicycle trailer as described above, particularly with regard to transport and storage. The trailer includes a frame and a wheel rotatably mounted on the frame. The trailer further includes an extension member having first and second ends. The first end is hingedly connected to the frame such that the extension member is selectively positionable between an extended position and a folded position. In the extended position, the extension member extends outwardly from the frame. In the folded position, the extension member is disposed adjacent the frame for compactness of storage and transport.

The trailer may further include a connector formed on the second end of the extension member and adapted to secure the trailer to the bicycle. Moreover, a seat may be mounted on the frame. Also, handle bars may be mounted on the frame. A pedal assembly may be interconnected with and operable to drive the wheel.

In a preferred embodiment, the extension member is hingedly connected to the frame by a foldable connector assembly. The foldable connector assembly includes a first hinge member which has first and second ends, and a second hinge member which has first and second ends. Each of the first ends of the first and second hinge members have at least one knuckle formed thereon. Each of the knuckles have a respective bore formed therethrough. A pin extends through each of the bores, whereby the first and second hinge members are relatively pivotable about the pin between a closed position and an open position. When the first and second hinge members are in the closed position, a longitudinal axis is defined between the second end of the first hinge member and the second end of the second hinge member. The connector assembly further includes a quick release mechanism operable to selectively secure the first and second hinge members in the closed position and to release the first and second hinge members into the open position. Each of the second ends of the first and second hinge members may have a reduced diameter portion adapted to securely fit into a tube of a prescribed size and shape.

In the trailer as just described, the quick release mechanism preferably includes a shank, a bearing surface movably mounted on the shank, and a tightening mechanism for selectively positioning the bearing surface between an upper position and a lower position. A tab is formed on the first end of the first hinge member. The shank is attached to the second hinge member and extends substantially transverse to the longitudinal axis and substantially transverse to the pin. The first hinge member, the second hinge member, the tab, and the bearing surface are relatively arranged and configured such that when the first and second hinge members are in the closed position, the tab is disposed between the bearing surface and the second hinge member. Further, when the bearing surface is in the upper position, the first and second hinge members may be transitioned between the closed and open positions. When the bearing surface is in the lower position and the first and second hinge members are in the closed position, the bearing surface prevents relative rotation of the first and second hinge members about the pin.

Preferably, the tab has a recess defined therein. The recess is relatively configured such that when the first and second hinge members are in the closed position, a portion of the shank is disposed in the recess.

Preferably, the tightening mechanism includes a cam member rotatably secured to the shank and has a cam lobe adjacent the bearing surface. The bearing surface is a bearing member slidably mounted on the shank and transitionable from the upper position to the lower position by rotating the cam member into a first position wherein the cam lobe forces the bearing member along the shank toward the second hinge member. The bearing member is transitionable from the lower position to the upper position by rotating the cam member into a second position wherein the cam lobe allows the bearing member to move away from the second hinge member.

Preferably, a spring is provided operative to bias the bearing surface away from the second hinge member.

In a connector assembly as described above, several additional features may be incorporated to minimize or eliminate relative twist of the hinge members and, accordingly, of the extension member and the frame. A first face may be formed on the first end of the first hinge member, the first face disposed at an angle of less than 90° with respect to the longitudinal axis when the first and second hinge members are in the closed position. A second face is formed on the first end of the second hinge member, the second face complementary to the first face. Preferably, the first face has a curved profile, the curved profile including a concave portion and a convex portion. Alternatively, or in addition to the preceding feature, one of the first and second hinge members may have a projection formed on the first end thereof and extending in the direction of the longitudinal axis. The other of the first and second hinge members has a recess formed in the first end thereof. When the first and second hinge members are in the closed position, the projection is received within the recess.

The present invention is further directed to a foldable connector assembly as described above.

The present invention is further directed to a bicycle trailer including a frame, a wheel rotatably mounted on the frame, and a trailer hitch extending, from the frame. The trailer hitch is formed in two sections joined by a hinge connection so as to be able to be folded together to conserve space or extended and locked to make an extended hitch. The hinge connection includes first and second bosses which are mounted to the sections and formed of sufficient bulk to provide for a rigid, extended hitch when locked.

The present invention is directed to a tandem bicycle including a trailer and a bicycle having a rear wheel and a first frame. The trailer includes a second frame, a wheel rotatably mounted on the frame, and an extension member extending over the rear wheel of the bicycle. The extension member has first and second ends. The first end of the extension member is hingedly connected to the second frame such that the extension member is selectively positionable between an extended position wherein the extension member extends outwardly from the second frame and a folded position wherein the extension member is disposed adjacent the second frame. A connector is formed on the second end of the extension member. The connector is detachably secured to the first frame of the bicycle.

The present invention is also directed to a method of shipping a bicycle trailer having a frame, a wheel rotatably mounted on the frame, and a trailer hitch, the trailer hitch formed in first and second sections joined by a hinge connection. The method includes folding the first and second sections together about the hinge connection to provide a more compact configuration.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENT

Figure 1:
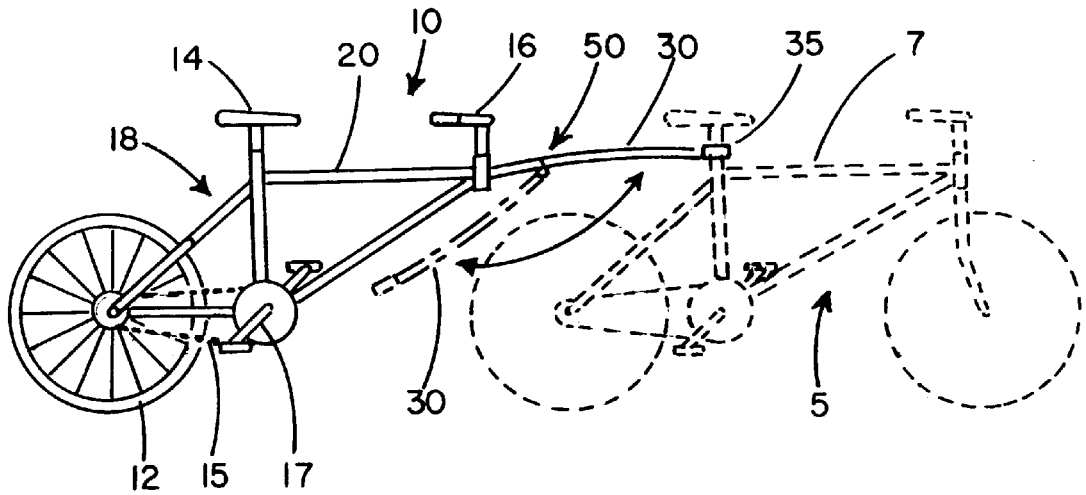
FIG. 1 is a side elevational, schematic view of a trailer incorporating the folding gooseneck according to the present invention, a folded configuration of the gooseneck being shown in dotted lines, and a towing bicycle also being shown in dotted lines.

With reference to FIG. 1, a tandem bike trailer according to the present invention, generally denoted by the numeral 10, is shown therein secured to a conventional bicycle 5 (shown in dotted lines) to form a tandem bicycle. As shown in solid lines, extension member or gooseneck 30 is in an extended position such that it extends over the rear wheel of bicycle 5. A suitable securement means 35, such as a releasable clamp, is attached to seat post 7 of bicycle 5. Various connectors or clamping mechanisms can be used. As discussed in more detail below, extension member 30 may be pivoted about connector assembly 50 as indicated by the arrow to place gooseneck 30 in a folded position, as shown in dotted lines.

Trailer 10 includes frame 18 to which rear wheel 12 is rotatably mounted. Rear wheel 12 may be driven by pedals 17 via chain 15. The rider sits on seat 14 which is secured to frame 18. The rider balances with handlebars 16, which are also mounted on frame 18. Horizontal frame member 20 is connected to extension member 30 by connector assembly 50. It will be appreciated that frame 18 may be otherwise configured. For example, extension member 30 may be connected to the diagonal frame member by connector assembly 50 with horizontal frame member 20 serving only as a brace.

Figure 2:
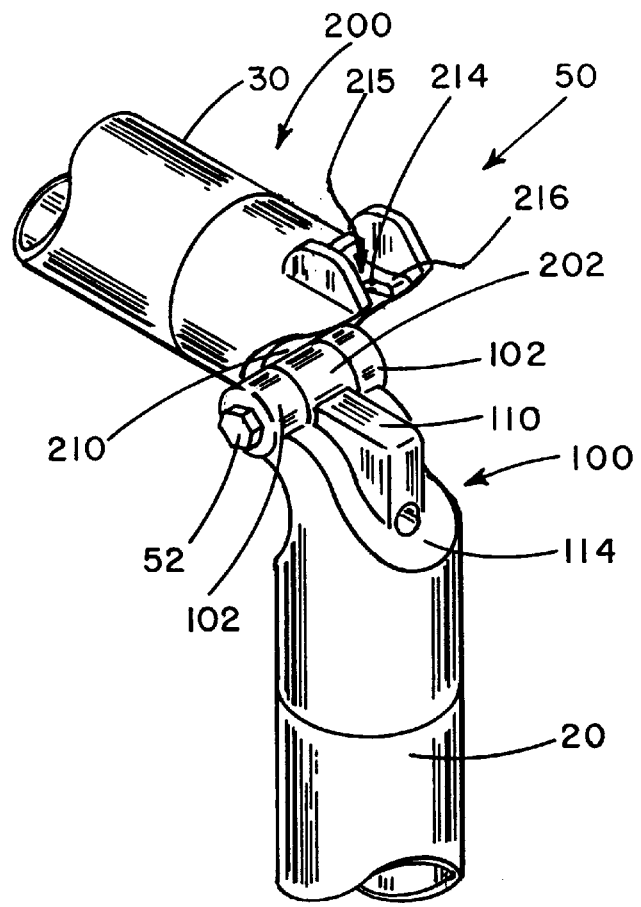
FIG. 2 is a perspective view of the hinged connection of the folding gooseneck according to the present invention shown in a folded position with the quick release mechanism removed.
Figure 3:
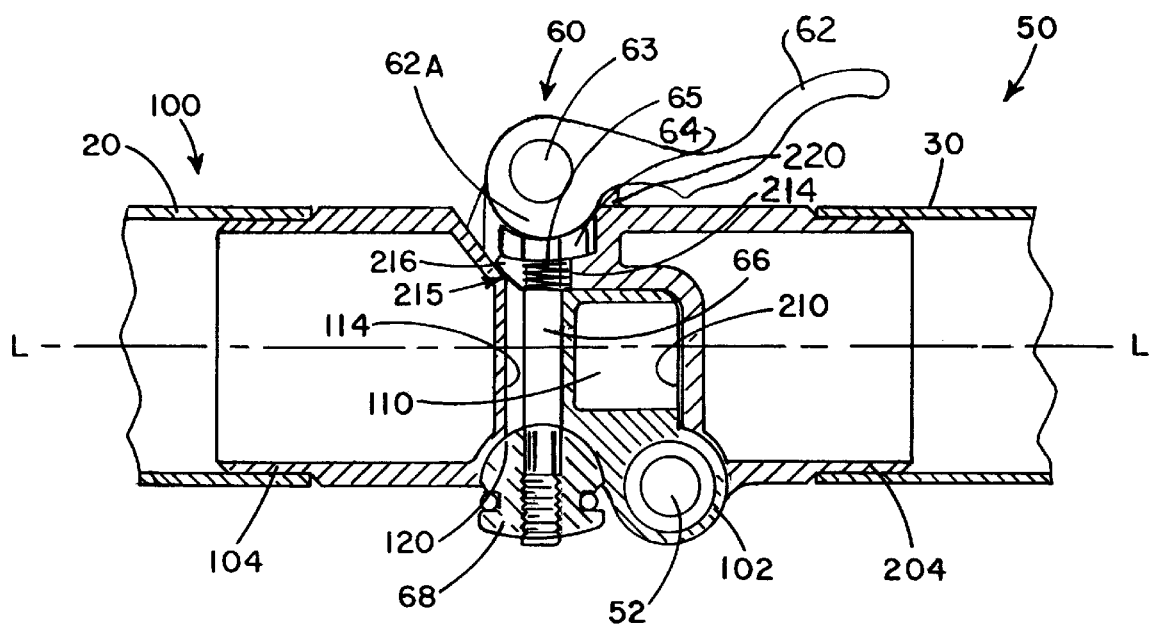
FIG. 3 is a side, cross sectional view of the connector assembly in an extended position.
Figure 4:
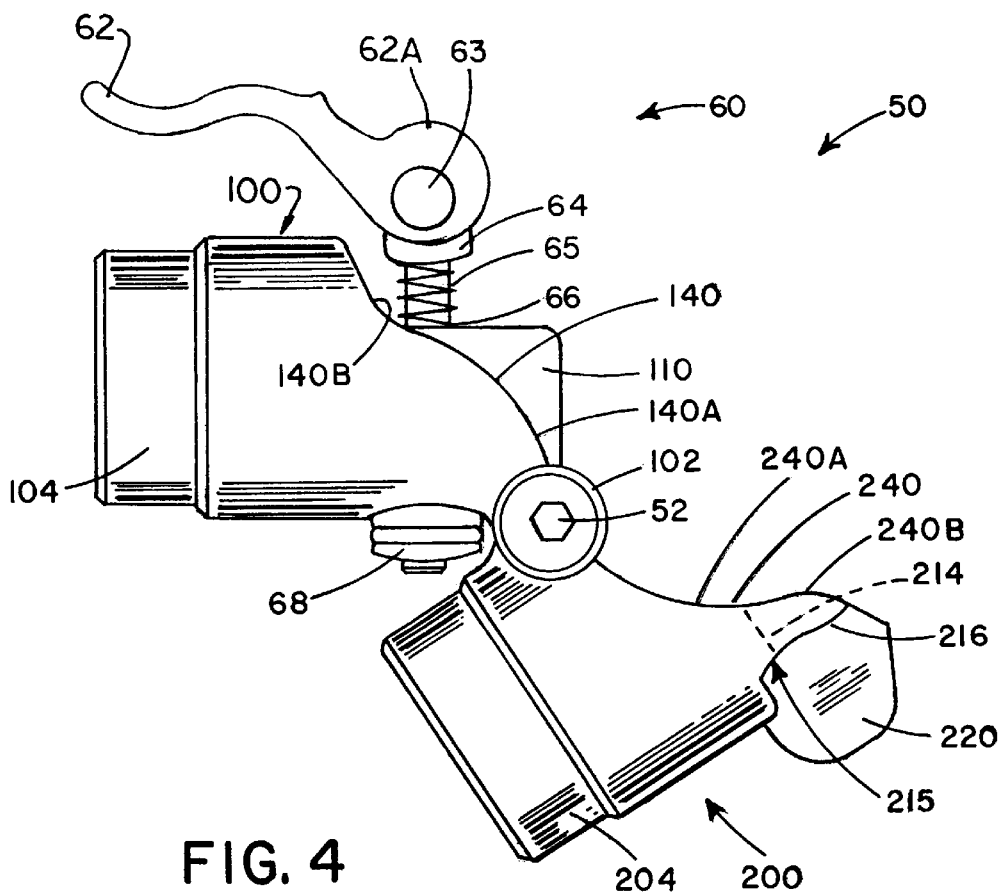
FIG. 4 is a side, elevational view of the connector assembly in a folded position.

Connector assembly 50 is shown in greater detail in FIGS. 2–4. (Quick release mechanism 60, as discussed below, is omitted from FIG. 2 for clarity.) Connector assembly 50 includes, generally, first hinge member 100 and second hinge member 200 joined by pin 52. As best seen in FIG. 3, hinge member 100 has reduced diameter portion 104 sized to fit within tubular frame member 20. Likewise, second hinge member 200 includes reduced diameter portion 204 sized to fit within tubular extension member 30. The tube inner dimensions and the reduced portions are relatively sized to provide interference fits therebetween which may be supplemented with adhesive, welding or other bonding techniques.

As best seen in FIG. 2, hinge member 100 has a pair of spaced apart knuckles 102 with aligned bores formed therethrough. The bores are oriented such that their axes are substantially transverse to longitudinal axis L—L, (see FIG. 3) and substantially parallel to the ground. Hinge member 200 has a centrally located knuckle 202. Knuckle 202 has a bore formed therethrough which is aligned with the bores of knuckles 102. Pin 52 extends through the bores of each of knuckles 102 and 202. Knuckle 202 spans substantially the entire gap between knuckles 102 with a small clearance provided to allow relative rotation of knuckles 102 and knuckle 202 about pin 52. From the foregoing, it will be appreciated that the arrangement of knuckles 102, knuckle 202, and pin 52 provides for the hinged connection of hinge members 100 and 200, as well as frame member 20 and extension member 30. Preferably, knuckles 102 extend the width of extension member 30 or greater.

With reference to FIGS. 3 and 4, quick release mechanism 60 and tab 215 formed on hinge member 200 allow the user to selectively lock and unlock connecting assembly 50 in the closed position shown in FIG. 3 (and, thus lock extension member 30 in the extended position). Quick release mechanism 60 includes shank 66, bearing member or washer 64, spring 65, lever 62, pin 63, and end cap 68. Shank 66 extends through bore 114 formed in first hinge member 100. End cap 68 is secured to the lower end of shank 66 and nests in cavity 120 formed in hinge member 100. End cap 68 thereby limits the upward movement of shank 66 with respect to hinge member 100. Moreover, end cap threadedly engages shank 66 and is turnable with respect thereto so that the position of end cap 68 may be adjusted to compensate for wear and variations in fabrication. Spring 65 is held between an upper surface of hinge member 100 and the lower surface of bearing member 64 and thereby urges bearing member 64 upward and into contact with lever 62. Lever 62 is pivotable about pin 63 between a locked position as shown in FIG. 3 and an unlocked position as shown in FIG. 4. Upwardly extending ears 220 (one on either side of lever 62) are provided to prevent rotation of lever 62 about shank 66 so that the lever remains aligned along the length of the gooseneck.

When lever 62 is in the locked position of FIG. 3, cam lobe 62A forces bearing member 64 downward into a lower position. When lever 62 is in the unlocked position of FIG. 4, the displacement of cam lobe 62A allows spring 65 to urge bearing member 64 into an upper position. In doing so, spring 65 causes lever 62 to assume the fully open position of FIG. 4, thereby giving a visual indication that the lock mechanism is unlocked. It will be appreciated from the foregoing that unless quick release mechanism 60 is disassembled, it will remain secured within bore 114 of hinge member 100 whether it is in the locked position or the unlocked position.

Second hinge member 200 has tab 215 with recess or cutout 214 formed therein to define fingers 216 on either side of the cutout. Cutout 214, tab 215, shank 66, spring 65, and bearing member 64 are each relatively configured so that when connecting assembly 50 is placed in the closed position as shown in FIG. 3, spring 65 and shank 66 are received within cutout 214 while bearing member 64 extends beyond cutout 214 to overlap at least a portion of tab 215. Preferably, bearing member 64 extends sidewardly to overlap fingers 216 and rearwardly to overlap a portion of tab 215 adjacent the apex of cutout 214, as shown in FIG. 3. In this way, when hinge members 100, 200 are in the closed position and lever 62 is in the locked position, as shown in FIG. 3, relative rotation of hinge members 100 and 200 about pin 52 is prevented by the interface of bearing member 64 against tab 215 including fingers 216, and the interface of end cap 68 against cavity 120. Preferably, the shank 66 extends transverse to pin 52.

When the user desires to open connecting assembly 50 to fold extension member 30 into the folded position, he or she need only rotate lever 62 into the open position of FIG. 4. Bearing member 64 is forced upwardly by spring 65, providing clearance for tab 215 as hinge member 200 rotates about pin 52.

As noted in the Background of the Invention, it is important that relative torsion or twisting between frame member 20 and extension member 30 be minimized. It will be appreciated that the arrangement of knuckles 102, knuckle 202, and pin 52 serves this purpose to a great extent. To further minimize twisting, rigid projection 110 is formed on hinge member 100 and complementary recess 210 is formed in hinge member 200 (see FIGS. 2 and 3). When connector assembly 50 is in the closed position, projection 110 nests within recess 210 to present sideways bending.

As best seen in FIG. 4, the respective profiles of hinge members 100 and 200 are selectively configured to further reduce the tendency for twist between the hinge members. Face 140 of hinge member 100 and face 240 of hinge member 200 each have a side profile which defines a general angle of less than 90°, and preferably about 45°, with respect to the longitudinal axis L—L (see FIG. 3) defined along the length of trailer 10. Faces 140 and 240 are complementary. Further, face 140 as viewed in side profile has convex portion 140A and concave portion 140B while face 240 has concave portion 240A and convex portion 240B which complement portions 140A and 140B, respectively. Each of these features serve to further minimize the ability of the hinge members to rotate with respect to each other about the longitudinal axis.

Notably, bearing member 64 is not essential to operation of the locking mechanism and may be omitted if the size and shape of cam lobe 62A are appropriately modified. Bearing member 64 serves primarily to prevent wear on cam lobe 62A. Thus, the bearing surface which bears against tab 215 in the locked position may be cam lobe 62A rather than the lower surface of bearing member 64.

While the quick release mechanism as disclosed provides for certain distinct advantages, it will be appreciated that other means for locking and unlocking the connecting assembly in the closed position may be employed. For example, a simple nut and bolt combination may be used. Alternatively other pivoted and secured joints may be substituted.

While a preferred embodiment of the present invention has been described, it will be appreciated by those of skill in the art that certain modifications may be made without departing from the scope of the present invention. All such modifications are intended to come within the scope of the claims which follow.

What is claimed is:

1. A trailer of the type for securing to and following a bicycle comprising:

a frame;

a wheel rotatable mounted on said frame; and an extension member having first and second ends, said first end hingedly connected to said frame such that said extension member is selectively positionable between an extended position wherein said extension member extends outwardly from said frame and a folded position wherein said extension member is disposed adjacent said frame for compactness of storage and transport.

wherein said extension member is hingedly connected to said frame by a foldable connector assembly, said foldable connector assembly comprising:

a first hinge member having first and second ends;

a second hinge member having first and second ends;

each of said first ends of said first and second hinge members having at least one knuckle formed thereon;

each of said knuckles having a respective bore formed therethrough;

a pin extending through each of said bores, whereby said first and second hinge members are relatively pivotable about said pin between a closed position and an open position, and wherein, when said first and second hinge members are in said closed position, a longitudinal axis is defined between said second end of said first hinge member and said second end of said second hinge member; and a quick release mechanism which includes a shank that extends through a bore formed in a said first hinge member, said bore being angled to said bores formed within said knuckles, and operable to selectively secure said first and second hinge members in said closed position and to release said first and second hinge members into said open position.

2. The trailer of claim 1 including a connector formed on said second end of said extension member and adapted to secure said trailer to the bicycle.

3. The trailer of claim 1 including a seat mounted on said frame.

4. The trailer of claim 3 including handle bars mounted on said frame.

5. The trailer of claim 1 including a pedal assembly interconnected with and operable to drive the wheel.

6. The trailer of claim 1 wherein each of said second ends of said first and second hinge members has a reduced diameter portion adapted to securely fit into a tube of a prescribed size and shape.

7. The trailer of claim 1 including a first face formed on said first end of said first hinge member, said first face disposed at angle of less than 90° with respect to said longitudinal axis when said first and second hinge members are in said closed position, and a second face formed on said first end of said second hinge member, said second face complementary to said first face.

8. The trailer of claim 7 wherein said first face has a curved profile, said curved profile including a concave portion and a convex portion.

9. The trailer of claim 1 wherein one of said first and second hinge members has a projection formed on said first end thereof and extending in the direction of said longitudinal axis, the other of said first and second hinge members having a recess formed in said first end thereof, and wherein, when said first and second hinge members are in said closed position, said projection is received within said recess.

10. A trailer of the type for securing to and following a bicycle comprising:

a frame;

a wheel rotatably mounted on said frame;

an extension member having first and second ends, said first end hingedly connected to said frame such that said extension member is selectively positionable within substantially the same plane as said wheel between an extended position wherein said extension member extends outwardly from said frame and a folded position wherein said extension member is disposed adjacent said frame for compactness of storage and transport;

a foldable connector assembly that hingedly connects said first end of said extension member to said frame comprising:

a first hinge member having first and second ends with a tab formed on said first end of said first hinge member;

a second hinge member having first and second ends;

each of said first ends of said first and second hinge members having at least one knuckle formed thereon;

each of said knuckles having a respective bore formed therethrough;

a pin extending through each of said bores, whereby said first and second hinge members are relatively visible about said pin between a closed position and an open position, and wherein, one said first and second hinge members are in said closed position, a longitudinal axis is defined between said end of first hinge member and said second end of said second hinge member; a quick release mechanism operable to selectively secure said first and second hinge members in said closed position and to release said first and second hinge members into said open position comprising:

a shank attached to said second hinge member and extending substantially transverse to said longitudinal axis and substantially transverse to said pin;

a bearing surface slideably mounted on said shank; and a tighten mechanism for selectively positioning said bearing surface between an upper and a lower position whereby said first hinge member, said second hinge member, said tab, and said bearing surface are relatively arranged and configured such that when said first and second hinge members are in said closed position, said tab is disposed between said bearing surface and said second hinge member when said bearing surfaces in said upper position, said first and second hinge members may be transitioned between said closed and open positions and when said bearing surface is in said lower position and said first and second hinge members are in said closed position, said bearing position prevents relative rotation of said first and second hinge members about said pin.

11. The trailer of claim 1 wherein said wheel defines a plane and said extension member is selectively positionable by rotation within substantially the same plane as said wheel.

12. The trailer of claim 10 wherein said tab has a recess defined therein, said recess relatively configured such that, when said first and second hinge members are in said closed position, a portion of said shank is disposed in said recess.

13. The trailer of claim 10 wherein:

said tightening mechanism includes a cam member rotatably secured to said shank and having a cam lobe adjacent said bearing surface;

said bearing surface is a bearing member slidably mounted on said shank and transitionable from said upper position to said lower position by rotating said cam member into a first position wherein said cam lobe forces said bearing member along said shank toward said second hinge member; and said bearing member is transitionable from said lower position to said upper position by rotating said cam member into a second position wherein said cam lobe allows said bearing member to move away from said second hinge member.

14. The trailer of claim 10 including a spring operative to bias said bearing surface away from said second hinge member.

15. A foldable connector assembly comprising:

a first hinge member having first and second ends;

a second hinge member having first and second ends;

each of said first ends of said first and second hinge members having at least one knuckle formed thereon;

each of said knuckles having a respective bore formed therethrough;

a pin extending through each of said bores, whereby said first and second hinge members are relatively pivotable about said pin between a closed position and an open position, and wherein, when said first and second hinge members are in said closed position, a longitudinal axis is defined between said second end of said first hinge member and said second end of said second hinge member; and a quick release mechanism which includes a shank that extends through a bore formed in a said first hinge member, said bore being angled to said bores formed within said knuckles, and operable to selectively secure said first and second hinge members in said closed position and to release said first and second hinge members into said open position.

16. The connector assembly of claim 15 wherein one of said first and second hinge members has a projection formed on said first end thereof and extending in the direction of said longitudinal axis, the other of said first and second hinge members having a recess formed in said first end thereof, and wherein, when said first and second hinge members are in said closed position, said projection is received within said recess.

17. The connector assembly of claim 15 wherein each of said second ends of said first and second hinge members has a reduced diameter portion adapted to securely fit into a tube of a prescribed size and shape.

18. A foldable connector assembly conspiring:
   a first hinge member having first and second ends;
   a second hinge member having first and second ends;
   each of said first ends of said first and second hinge members having at least one knuckle formed thereon;
   each of said knuckles having a respective bore formed therethrough;
   a pin extending through each of said bores, whereby said first and second hinge members are relatively pivotable about said pin between a closed position and an open position, and wherein, when said first and second hinge members are in said closed position, a longitudinal axis is defined between said second end of said first hinge member and said second end of said second hinge member; and
   a quick release mechanism operable to selectively secure said first and second hinge members in said closed position and to release said first and second hinge members into said open position wherein
   a) said quick release mechanism includes:
      i) a shank;
      ii) a bearing surface movably mounted on said shank; and
      iii) a tightening mechanism for selectively positioning said bearing surface between an upper position and a lower position;
   b) a tab is formed on said first end of said first hinge member;
   c) said shank is attached to said second hinge member and extends substantially transverse to said longitudinal axis and substantially transverse to said pin; and
   d) said first hinge member, said second hinge member, said tab, and said bearing surface are relatively arranged and configured such that;
      i) when said first and second hinge members are in said closed position, said tab is disposed between said bearing surface and said second hinge member;
      ii) when said bearing surface is in said upper position, said first and second hinge members may be transitioned between said closed and open positions; and
      iii) when said bearing surface is in said lower position and said first and second hinge members are in said closed position, said bearing surface prevents relative rotation of said first and second hinge members about said pin.

19. The connector of claim 18 wherein said tab has a recess defined therein, said recess relatively configured such that, when said first and second hinge members are in said closed position, a portion of said shank is disposed in said recess.

20. The connector assembly of claim 18 wherein:
   said tightening mechanism includes a cam member rotatably secured to said shank and having a cam lobe adjacent said bearing member;
   said bearing surface is a bearing, member slidably mounted on said shank and transitionable from said upper position to said lower position by rotating said cam member into a first position wherein said cam lobe forces said bearing member along said shank toward said second hinge member; and
   said bearing surface is transitionable from said lower position to said upper position by rotating said cam member into a second position wherein said cam lobe allows said bearing member to move away from said second hinge member.

21. The connector assembly of claim 18 including a spring operative to bias said bearing surface away from said second hinge member.

22. The connector assembly of claim 15 including a first face formed on said first end of said first hinge member, said first face disposed at an angle of less than 90° with respect to said longitudinal axis when said first and second hinge members are in said closed position, and a second face formed on said first end of said second hinge member, said second face complementary to said first face.

23. The connector assembly of claim 22 wherein said first face has a curved profile, said curved profile including a concave portion and a convex portion.

* * * * *